CIRCUIT ARRANGEMENT FOR CORRECTING THE WHITE LEVEL IN A COLOR TELEVISION RECEIVER

Filed July 18, 1958 2 Sheets-Sheet 1

INVENTOR
HENDRIK BREIMER

BY
Frank R. Jifari
AGENT

INVENTOR
HENDRIK BREIMER
BY Frank R. Jifani
AGENT 2,975,232
Patented Mar. 14, 1961

2,975,232

CIRCUIT ARRANGEMENT FOR CORRECTING THE WHITE LEVEL IN A COLOR TELEVISION RECEIVER

Hendrik Breimer, Eindhoven, Netherlands, assignor to North American Philips Company, Inc., New York, N.Y., a corporation of Delaware Filed July 18, 1958, Ser. No. 749,549

Claims priority, application Netherlands Aug. 24, 1957

10 Claims. (Cl. 178—5.4)

The invention relates to a circuit arrangement for correcting the white level in a colour television receiver for the reproduction of a colour television signal, which consists of a brightness signal and complex colour signals, which are modulated on at least one subcarrier, these colour signals furnishing, subsequent to detection and modification in a matrix circuit, output signals, these output signals being fed, if necessary subsequent to amplification, to the electron guns of at least one reproducing tube.

Such circuit arrangements are required to provide the possibility to vary, separately or partly in combination, the levels of each of the said colour signals, in order to avoid colour distortion in the grey or white image produced, colour distortion being understood to mean herein that the image is not purely white or grey, but slightly reddish, bluish or has a slightly deviating hue.

The correction then requires a variation of the brightness level of each of the reproducing tubes, if use is made of a colour television system having three tubes, or of each of the guns, if one reproducing tube with three guns is employed, this variation may take place by correctly adjusting the three guns of one or more tubes.

With known arrangements this is performed, for example, by varying the bias voltage of the direct-current restorers, which are coupled directly with the control-grids of the guns.

However, if D.C. amplifiers are employed, or if use is made of synchronous detectors operating at high levels and coupled directly with the control-electrodes of the guns, this method cannot be used. In this case the correction may be carried out, for example, by varying the voltages at the first or second acceleration anodes of the guns. However, this has the disadvantage that, at the same time, the whole characteristic curve of the controlled reproducing tube or the gun respectively is varied, so that the uniformity of the tubes or of the guns respectively gets lost.

With a further method the direct-voltage levels of the control-electrodes of the guns, to which are fed the signals obtained from the video output stages, are varied. If this D.C. voltage variation is to be rendered effective without affecting the anode impedance concerned, a series resistor must be provided between the point where otherwise the video signal is obtained and the said control-electrode. This has, however, the effect that also the desired signal components are attenuated. In order to obviate this attenuation as far as possible, the series resistor is shunted by a capacitor. Thus the amplitude characteristic curve exhibits a drip of about 0.5 for the low frequencies with respect to the high frequencies. Moreover, the D.C. voltage component of the signal is transferred, in this case, only by half, which may give rise, under certain conditions, to colour errors.

The circuit arrangement according to the invention mitigates these disadvantages and is characterized in that the arrangement comprises, moreover, an auxiliary matrix circuit, which is proportioned such that, if information in the form of electrical voltages is supplied to this auxiliary matrix circuit, the information obtained therefrom exhibits the same linear relationship to the supplied information, as the colour signals exhibit with respect to the composing colour components, the information obtained being added to the associated colour signals either prior to or after the detectors.

A few possible embodiments of the circuit arrangement according to the invention will be described with reference to the figures.

Fig. 1 shows, in a block diagram, a first embodiment.

Fig. 2 serves for explanation.

Figures 1, 2:
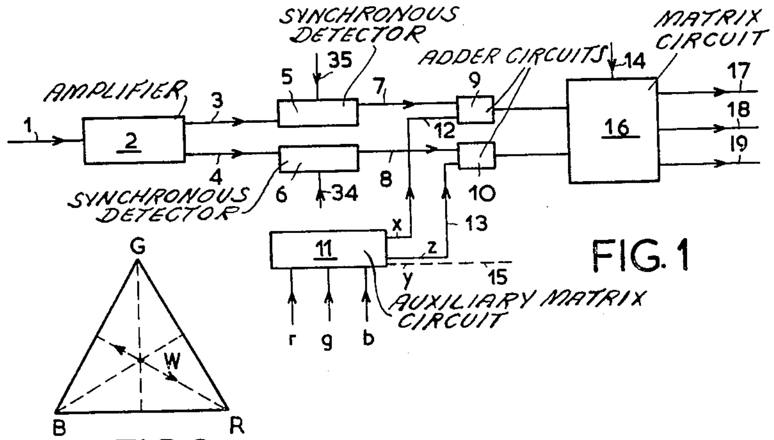

Referring to Fig. 1, which shows an arrangement for a three-colour television system, the colour signal obtained from the first video detector is fed via the conductor 1 to the amplifier 2, which supplies the amplified signal via the conductors 3 and 4 to the synchronous detectors 5 and 6, to which, moreover, via the conductors 34 and 35 the auxiliary oscillations produced in an auxiliary oscillator are fed. The two complex colour signals are separated, in known manner, in these detectors and detected herein and supplied via the conductors 7 and 8 to the adder circuits 9 and 10, to which are also supplied the auxiliary voltages obtained in accordance with the invention, via the conductors 12 and 13, after which the combined signals are fed to the matrix circuit 16.

Leaving first the auxiliary voltages supplied via the conductors 12 and 13 out of consideration, three signals R, G and B can be obtained from the matrix circuit 16 (R=red signal, G=green signal, B=blue signal), if moreover the brightness signal Y is fed via the conductor 14 to the circuit 16.

If the colour signals supplied via the conductors 7 and 8 are designated by the magnitudes X and Z and the brightness signal supplied via the conductor 14 by Y, whilst the colour components obtained from the conductors 17, 18 and 19 are designated by R, G, and B, the relative linear relationship between these magnitudes is given by the equations:

$$\begin{aligned} X &= \alpha_1.R+\alpha_2.G+\alpha_3.B \\ Z &= \beta_1.R+\beta_2.G+\beta_3.B \\ Y &= \delta_1.R+\delta_2.G+\delta_3.B \end{aligned} \qquad (1)$$

wherein the proportionality constants $\alpha_{1,2,3}$, $\beta_{1,2,3}$ and $\delta_{1,2,3}$ are determined by the system employed, whilst, at the same time, it obtains that: $\delta_1+\delta_2+\delta_3=1$.

Herein the magnitudes X and Z designate the two complex colour signals, modulated in the signal supplied to the first video detecter, on two separate carriers or with a phase shift of 90° on one subcarrier. The sidebands of the modulated subcarriers, in the first as well as in the second case, are lying within the frequency spectrum of the brightness signal. In the case of two carriers, non-synchronous detectors may be used for detection.

If the signal Y is not supplied, the output signals are $R-Y$, $G-Y$ and $B-Y$ respectively. This is applied in most modern receivers, in which the Y signal is supplied to separate electrodes of the guns.

The conductors 17, 18 and 19 may be coupled directly with the three guns of one or more reproducing tubes.

If the brightness level is to be varied for each of the three signals, direct voltages are to be added to the three signals R, G, B.

However, this implies the disadvantages referred to in the preamble, if this addition is to be carried out in the output circuits of the video output stages. If this is carried out, on the contrary, in the input circuits of these output stages, the relative ratios between the colour components are, at the same time, affected, since these final stages form part of the matrix circuit proper. This may be avoided by supplying the direct voltages to be added in a given ratio which does not disturb the relative relationship.

In order to obtain the required direct voltages in the correct ratios, provision is made, in accordance with the invention, of an auxiliary matrix circuit 11, which is to be proportioned such that the output voltages thereof exhibit the same relationship with respect to the direct voltages supplied to the auxiliary matrix circuit as the colour signals exhibit with respect to the composing colour components.

From the foregoing it follows that the relationship between the correction voltages and the voltages supplied to the auxiliary matrix can be found with the aid of (1).

If the direct voltages supplied to the auxiliary matrix are designated by $r$, $g$ and $b$ and the output voltages obtained by $x$, $z$ and $y$, the same relationship applies to these signals as that indicated by (1). Consequently:

$$\begin{aligned} x&=\alpha_1.r+\alpha_2.g+\alpha_3.b \\ z&=\beta_1.r+\beta_2.g+\beta_3.b \\ y&=\delta_1.r+\delta_2.g+\delta_3.g \end{aligned} \qquad (2)$$

Only the voltages $x$ and $z$ are utilized and added, in the adding circuits 9 and 10, to the signals X and Z, so that the signals $X+x$ and $Z+z$ are supplied to the matrix circuit 16.

This will be explained with reference to a numerical example; herein the coefficients of the American N.T.S.C. system are used, so that can be written:

$$x=i=0.60.r-0.28.g-0.32.b \qquad (3)$$
$$z=q=0.21.r-0.52.g+0.31.b \qquad (4)$$
$$y=0.30.r+0.59.g+0.11.b \qquad (5)$$

wherein $x=i$ and $z=q$, since for the N.T.S.C. system the magnitudes X and Z can be replaced by I and Q.

If, for example, a cyan-coloured image is observed, whereas a white or greyish image is expected, readjustment towards red is to be carried out.

This is illustrated in Fig. 2, which shows a colour triangle, the corners of which are designated by R, G and B, which represents the three colour components; W designates the spot where the relative ratio between the three components R, G and B, is determined by the coefficients of the Equation 5. If the components R, G and B are equal to each other, and if they are supplied in the ratios determined by (5), a white or grey image must be observed.

With a cyan-colour distortion this spot has moved in the direction RW and it is necessary to add a positive value in R-direction in order to shift back the spot in the WR-direction, i.e. a definite, positive D.C. voltage $r$ must be fed to the auxiliary matrix 11. From (3) and (4) it follows in this case that:

$$i=0.60.r$$
$$q=0.21.r$$

In the N.T.S.C. system we find for the corrected signals $R_1$, $G_1$ and $B_1$.

$$\begin{aligned} R_1&=0.96I_1+0.62Q_1+Y_1 \\ G_1&=-0.27I_1-0.65Q_1+Y_1 \\ B_1&=-1.10I_1+1.70Q_1+Y_1 \end{aligned}$$

The complex signals are:

$$\begin{aligned} I_1&=I+i=0.60R-0.28G-0.32B+0.60.r \\ Q_1&=Q+q=0.21R-0.52G+0.31B+0.21.r \\ Y_1&=Y \end{aligned}$$

Introducing this into the equations for $R_1$, $G_1$ and $B_1$, we obtain:

$$\begin{aligned} R_1&=R+0.96\,.\,0.60.r+0.62\,.\,0.21.r=R+0.7.r \\ G_1&=G-0.27\,.\,0.60.r-0.65\,.\,0.21.r=G-0.3.r \\ B_1&=B-1.10\,.\,0.60.r+1.70\,.\,0.21.r=B-0.3.r \end{aligned}$$

From the last equations it follows that a shift towards red occurs, so that the cyan-coloured distortion can be corrected. The required degree of this correction is determined by the value of the direct voltage $r$, which may be varied to this end.

In a similar manner a reddish distortion may be corrected by supplying a direct voltage $-r$, a greenish distortion by supplying a direct voltage $-g$, and so on.

From:

$$Y_2=0.30R_1+0.59G_1+0.11B_1=0.30R+0.59B+0.11B+O.r=Y$$

it follows that the brightness signal has remained unchanged, so that this correction method does not affect the total brightness.

It should be noted that, in principle, the supply of two variable direct voltages to the auxiliary matrix could suffice, since owing to the aforesaid dependence of the three colour components the third will always be varied with a variation of the two others. However, the adjustment is then no longer independent, which causes difficulty to the user. This may be avoided by supplying three components $r$, $g$ and $b$. The dependence is maintained, it is true, but it always has the correct direction. This also applies to the aforesaid numerical example. The R-signal is increased by $0.7.r$ and, at the same time, the G and B-signals are reduced by $0.3.r$. The common influence of the two latter components is exerted towards red, so that the effect aimed at is supported.

Figure 3:
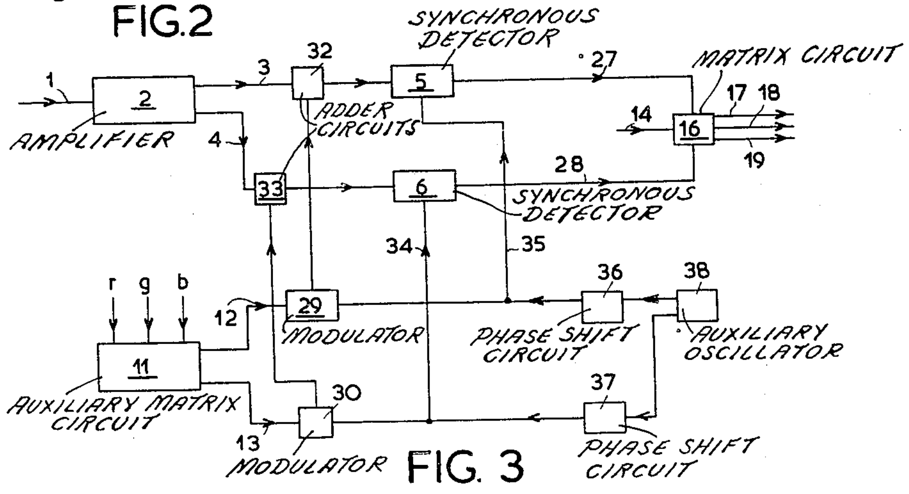
Fig. 3 shows a second embodiment, also in a block diagram.

A second embodiment, which is also based, by way of example, on the N.T.S.C. system, is shown in Fig. 3. The matrix 11 supplies again the signals $i$ and $q$, which are fed to modulator circuits 29 and 30. To these modulators are also fed the auxiliary oscillations from the auxiliary oscillator 38, which oscillations are subjected in the phase-shifting networks 36 and 37 to such a phase shift that they have a relative phase difference of 90°. The auxiliary oscillation fed to the circuit 29 has the shape: $\cos(\omega t+\varphi)$, so that subsequent to modulation the output signal of the circuit 29 becomes equal to:

$$i\cos(\omega t+\varphi)$$

In a similar manner the output signal of the circuit 30 becomes:

$$q\sin(\omega t+\varphi)$$

The signal originating from the amplifier 2 has the form:

$$E=I\cos(\omega t+\varphi)+Q\sin(\omega t+\varphi)$$

After addition in the adding circuits 32 and 33, we obtain the signals:

$$\begin{aligned} E_{32}&=(I+i)\cos(\omega t+\varphi)+Q\,.\sin(\omega-\varphi) \\ E_{33}&=I\,.\cos(\omega t+\varphi)+(Q+\varphi)\,.\sin(\omega t+\varphi) \end{aligned}$$

In order to detect these signals, the detector 5 has fed to it via the conductor 35 the auxiliary oscillation $\cos(\omega t+\varphi)$ and the detector 6, via conductor 34, the auxiliary oscillation $\sin(\omega t+\varphi)$. After detection and filtration, we obtain the signals $(I+i)$ and $(Q+q)$, which are fed in a corresponding manner to the matrix 16.

If detection takes place at a high level, the matrix circuit 16 is included directly in the detectors 5 and 6 and the outputs of these detectors can be connected directly to the guns of one or more reproducing tubes.

It should be noted here that, if detection does not take place in the directions I and Q, but in a different direction, both the proportioning of the auxiliary matrix and the phase of the auxiliary oscillations are to be adapted.

It will be assumed that detection is to take place in the $R-Y$ and in the $B-Y$ directions. For the N.T.S.C. colour signal we may write, whilst neglecting the signals of frequencies exceeding 0.5 mc./s. of the I-signal, $$\frac{R-Y}{1.14}\cos\omega t+\frac{B-Y}{2.03}\sin\omega t$$

The auxiliary oscillations cos $\omega t$ and sin $\omega t$ are then supplied and modulated by the direct voltages $$\frac{x}{1.14}\text{ and }\frac{z}{2.03}$$

from the auxiliary matrix 11, so that:

$$E_{32}=\frac{R-Y+x}{1.14}\cos\omega t+\frac{B-Y}{2.03}\sin\omega t$$

and $$E_{33}=\frac{R-Y}{1.14}\cos\omega t+\frac{B-Y+z}{2.03}\sin\omega t$$

so that after detection and modification in the matrix associated with the two detectors, the signal $$(X+x)=R-Y+x$$

and $(Z+z)=B-Y+z$ are obtained, after which the green difference signal follows from the relation:

$$G-Y=-0.51(R-Y)-0.19(B-Y)$$

so that $$(G-Y)'=-0.51(R-Y)-0.51x-0.19(B-Y)-0.19z$$

In this case the signals supplied by the auxiliary matrix 11 must fulfill the conditions:

$$\frac{x}{1.14}=\frac{r-y}{1.14}=\frac{0.70r-0.41g-0.11b}{1.14}$$

$$\frac{z}{2.03}=\frac{b-y}{2.03}=\frac{-0.30r-0.59g+0.89b}{2.03}$$

which relations may be readily obtained with the aid of the Equation 5.

It will be obvious that if detection is to take place in a direction differing from the $(R-Y)$ and the $(B-Y)$-directions, the angle $\varphi$ in the auxiliary oscillations must not be zero, but be chosen in accordance with the desired sense of detection.

The said adaptation is to take place also when the direct-voltages are added to the colour signals not before but after the synchronous detection.

Figure 4:
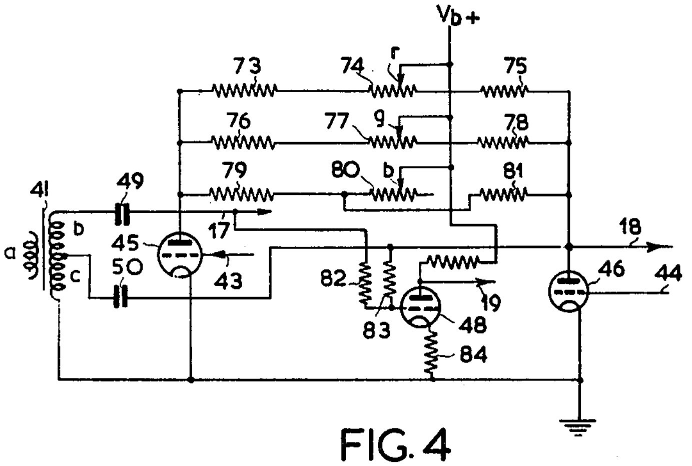
Fig. 4 shows a third embodiment.

An embodiment adapted to the latter case is shown in Fig. 4. In this figure the arrangement known per se, comprising the tubes 45, 46 and 47 represents a detector circuit for detecting the colour signals at high level. The colour signals are supplied via the transformer 41 and the capacitors 49 and 50, whilst the auxiliary oscillations are fed in the correct phases via the conductors 43 and 44 to the control-grids of the tubes 45 and 46. With a correct proportioning of the resistors 73 to 84 and of the ratios between the windings $a$, $b$ and $c$ of the transformer 41, which constitute, together, the matrix circuit of the system, the colour difference signals $R-Y$, $G-Y$ and $B-Y$ may be obtained from the conductors 17, 18 and 19 be fed directly to the three guns of the reproducing tube(s), to which guns is, moreover, fed the Y-signal. The auxiliary matrix 11 is, in this case, reduced to the three potentiometers 74, 77 and 80, which are provided with the tappings $r$, $g$ and $b$, which are connected to the positive terminal of a direct-voltage source (not shown). The total impedance of the resistors 73 to 81 is high with respect to the internal impedance of the tubes 45 and 46. By displacing one or more of the tappings $r$, $g$ or $b$, the anode voltages of the tubes 45 and 46 may be varied and thus the direct voltage component for the control of the white level can be added to the signals $R-Y$ and $G-Y$, but also to the $B-Y$ signal, since a D.C. voltage variation at the anodes of the tubes 45 and 46 is automatically transferred to the control-grid of the tube 48.

By displacing the tappings $r$, $g$ and $b$, the anode impedances of the tubes 45 and 46 are, at the same time, varied so that the ratios between the output signals are disturbed, since the resistors 73 to 81 form part of the matrix of this detection system. The error thus introduced is, however, negligible with respect to the level variation since for the direct voltage the tubes 45 and 46 are in series with the resistors 73 to 81, so that, with a displacement of one or more of the tappings $r$, $g$ and $b$, the anode voltage variation will be substantially inversely proportional to the variation in anode impedance, whilst for the alternating-voltage signal the resistors may be considered to be in parallel with the tubes, so that the variation in anode impedance will have only little effect on the signal produced.

Figure 5:
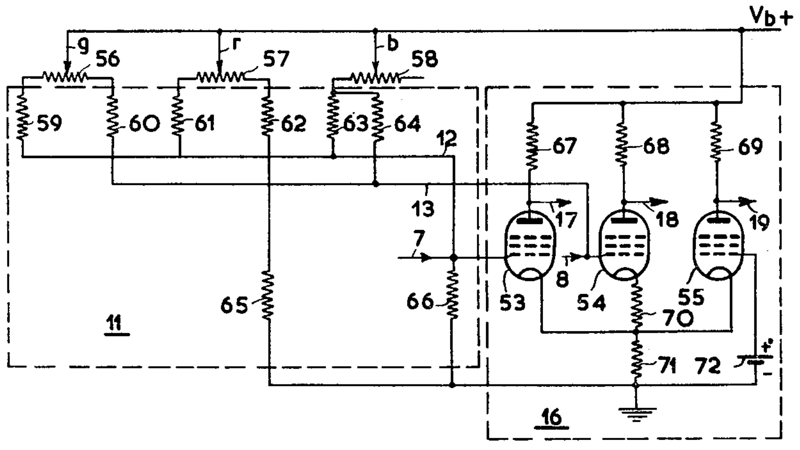
Fig. 5 shows a practical embodiment of the principle of the arrangement shown in Fig. 1.

Finally, Fig. 5 shows a practical embodiment of the arrangement shown in Fig. 1. The potentiometers 56, 57 and 58 supply the direct voltages $g$, $r$ and $b$ for the auxiliary matrix circuit 11, comprising the resistors 59 to 66. The value of the voltages may be varied with the aid of the displaceable tappings on the said potentiometers. Via the conductor 12 the complex direct voltage $x$ is supplied to the control-grid of the tube 53, to which is supplied, via the conductor 7, the signal X. In a similar manner, the complex direct voltage $z$ is supplied via the conductor 13 and the signal Z via the conductor 8 to the control-grid of the tube 54. The grid circuits of the tubes 53 and 54 constitute, so to say, the adding circuits, which are designated by 9 and 10 in Fig. 1; but at the same time these tubes form part of the matrix circuit 16, which comprises the tubes 53, 54 and 55 and the associated resistors 67 to 71. The signals $R-Y$, $G-Y$ and $B-Y$ with their direct voltages for the white-level control can then be obtained from the conductors 17, 18 and 19 and supplied to the guns of one or more reproducing tubes.

It should be noted that the direct voltage for the circuit arrangement shown in Fig. 5 is obtained from a direct-voltage source (not shown), which supplies a direct voltage $V_b$. The tappings of the potentiometers 56, 57 and 58 and the ends of the resistors 67, 68 and 69 remote from the anodes of the tubes are connected to the positive terminal of this voltage source. The control-grids of the tubes 53 and 54 are therefore positive to earth, so that the common cathode resistor 71 and the separate cathode resistor 70 for tube 54 are required, moreover, to provide a negative potential at the control-grids of the tubes 53 and 54 with respect to the cathode. A correct adjustment of tube 55 then requires the provision of a battery 72, which serves to provide the correct negative bias voltage of the control-grid of tube 55 with respect to the associated cathode. It will be obvious that when calculating both the auxiliary matrix 11 and the matrix 16, not only the desired ratios between the supplied signals and direct voltages, but also the D.C. adjustments of the tubes 53, 54 and 55 and the desired ratios between the signal at the anodes of the tubes 53, 54 and 55 must be taken into consideration.

Possible values for the auxiliary matrix 11 and the potentiometers, when used for a colour signal of the N.T.S.C. system, are:

$R_{56}=R_{57}=R_{58}=5$ KΩ
$R_{59}=166$KΩ; $R_{60}=107$KΩ; $R_{61}=107$KΩ; $R_{62}=180$KΩ
$R_{63}=153$ KΩ; $R_{64}=143$ KΩ; $R_{65}=R_{66}=27$ KΩ

It is evident from the values indicated above, that the resistance values of the potentiometers 56, 57 and 58 are low with respect to those of the resistors 59 to 64. This is required for a satisfactory operation of the arrangement.

What is claimed is:

1. A system for correcting the white level in a color television receiver of the type adapted to receive color television signals which include a plurality of complex color signals, said system comprising first matrix means for combining said complex color signals to provide first output signals having a predetermined linear relationship with respect to said color signals, a source of information voltages, second matrix means, means for connecting said source to said second matrix means to provide second output signals, and means combining said second output signals with said complex color signals, said second matrix being proportioned to provide the same linear relationship between said second output signals and said information signals that exists between said complex color signals and said first output signals.

2. A system for correcting the white level in a color television receiver of the type adapted to receive color television signals which include a brightness signal and a plurality of complex color signals, said system comprising first matrix means for combining said complex color signals to provide color output signals having a linear relationship with respect to said complex color signals, reproducing tube means, means applying said color output signals to said tube means, second matrix means, a source of white level correction information signals, means connecting said source to said second matrix means to provide second output signals, and means combining said second output voltages with said complex color signals, said second matrix means being proportioned to provide the same linear relationship between said second output signals and information signals that exists between said complex color signals and said color output signals.

3. The system of claim 2 in which said complex color signals include two signals X and Z, the relationship between the signals X and Z and the color output signals R, G and B is given by the following equations:

$$X=\alpha_1 R+\alpha_2 G+\alpha_3 B$$
$$Z=\beta_1 R+\beta_2 G+\beta_3 B$$

where $\alpha_1$, $\alpha_2$, $\alpha_3$, $\beta_1$, $\beta_2$ and $\beta_3$ are constants, the second matrix means is proportioned so that, when three information signals $r$, $g$ and $b$ are supplied thereto the output voltages $x$ and $z$ thereof fulfill the equations:

$$x=\alpha_1 r+\alpha_2 g+\alpha_3 b$$
$$z=\beta_1 r+\beta_2 g+\beta_3 b$$

and the signals $x$ and $z$ are combined respectively with the signals X and Z.

4. The system of claim 2 in which said information signals comprise variable direct voltages.

5. A system for correcting the white level in a color television receiver of the type adapted to receive color television signals which include a brightness signal and a plurality of complex color signals, said system comprising detector means for detecting said complex color signals, first matrix means connected to combine the output signals of said detector means and said brightness signal to provide color output signals having a linear relationship with respect to said detector output signals, second matrix means, a source of variable direct voltages, means connecting said source to said second matrix means to provide third output signals, and means combining said third output signals with said detector output signals, said second matrix being proportioned to provide the same linear relationship between said third output signals and direct voltages that exists between said detector output signals and said color output signals.

6. The system of claim 5 in which said second matrix means comprises first and second output terminals, a source of positive potential, a ground reference, first and second resistance means connected between said ground reference and said first terminal, third and fourth resistance means connected between said first and second terminals, means connecting said source of positive potential to variable tappings on said first and third resistance means, and means connecting said source of positive potential to a fixed point on said fourth resistance means by way of variable resistance means.

7. A system for correcting the white level in a color television receiver of the type adapted to receive a pair of complex color signals modulated on a subcarrier and having a relative phase shift of 90°, said system comprising synchronous detector means for detecting said color signals, first matrix means connected to the output circuits of said detector means to combine the outputs thereof for providing color output signals having a predetermined linear relationship with respect to said complex color signals, auxiliary matrix means, a source of information signals connected to the input circuit of said auxiliary matrix means to provide a pair of third output signals, means modulating auxiliary oscillations having a relative phase difference of 90° with said third output signals, and means separately combining the modulated oscillations with said complex color signals, said auxiliary matrix means proportioned to provide the same linear relationship between said third output signals and said information signals that exists between said complex color signals and said color output signals.

8. The system of claim 7 in which said information signals comprise variable direct voltages.

9. The system of claim 7 in which the phase of said auxiliary oscillations deviates from the phase at which said complex color signals are modulated on said subcarrier, the direction of synchronous detection varying with the phase difference between said auxiliary oscillations and said complex color signals.

10. The system of claim 7 in which said detector means comprises a pair of detector tubes, said matrix means comprises first, second and third series resistance means connected between the anode circuits of said tubes, and said auxiliary matrix means comprises variable connections between said first and second means and a source of operating voltage, and variable resistance means connected between a fixed point on said third resistance means and said source of operating voltage.

References Cited in the file of this patent

UNITED STATES PATENTS

| | | |
|---|---|---|
| 2,745,900 | Parker | May 15, 1956 |
| 2,888,514 | Pritchard | May 26, 1959 |